United States Patent [19]

Sakurada et al.

[11] 4,167,332
[45] Sep. 11, 1979

[54] INDICATION AND PHOTOMETRIC UNIT

[75] Inventors: Nobuaki Sakurada, Yokohama; Nobuhiko Shinoda, Tokyo; Tadashi Ito, Yokohama; Yukio Mashimo, Tokyo; Fumio Ito, Yokohama, all of Japan

[73] Assignee: Canon Kabushiki Kaisha, Tokyo, Japan

[21] Appl. No.: 874,023

[22] Filed: Feb. 1, 1978

Related U.S. Application Data

[63] Continuation of Ser. No. 622,835, Oct. 16, 1975, abandoned.

[30] Foreign Application Priority Data

Oct. 17, 1974 [JP] Japan ............................. 49/119627

[51] Int. Cl.² .................... G01J 1/42; G03B 13/02
[52] U.S. Cl. ................................ 356/227; 356/226; 354/23 R; 354/53

[58] Field of Search ............ 356/226, 227; 354/23 R, 354/23 D, 53, 60 L

[56] References Cited

U.S. PATENT DOCUMENTS

| 3,846,028 | 11/1974 | List | 356/226 X |
|---|---|---|---|
| 3,846,805 | 11/1974 | Kiyohara | 354/23 |
| 3,872,483 | 3/1975 | Numata | 354/53 |
| 3,971,048 | 7/1976 | Ito et al. | 354/60 L |

Primary Examiner—Rolf G. Hille
Attorney, Agent, or Firm—Toren, McGeady and Stanger

[57] ABSTRACT

The present invention relates to an integrated circuit body suited to be applied for a TTL single reflex camera, by arranging at least two of the three circuit parts, namely the indication circuit part presenting an indication function, the light sensing circuit part presenting a light sensing function and the control-operation circuit part.

5 Claims, 6 Drawing Figures ial prism 30.

INDICATION AND PHOTOMETRIC UNIT

This is a continuation of application Ser. No. 622,835, filed Oct. 16, 1975, now abandoned.

BACKGROUND OF THE INVENTION

1. Field of the Invention

The present invention relates to an integrated circuit body, particularly suited to be applied for the exposure control circuit including the light measuring function, the operation function, the indication function, the control function and so on in the single reflex camera of TTL light measuring system.

2. Description of the Prior Art

Recently the single reflex camera presenting the light measurement operation function and the automatic exposure control function is becoming more and more popular, whereby in case of such a camera, it is necessary to provide in the camera body the light sensing element for light measurement, its driving circuit, the operation circuit for operating the control information necessary for obtaining the proper exposure basing upon various kinds of set photographic informations such as the film speed, the exposure time, the aperture value and the totally opened aperture value of the photographic lens and the light measurement information, the indication means for indicating the necessary photographic informations such as set or operated aperture value or exposure time, its driving circuit, the control circuit for controlling the camera in accordance with the set or operated aperture value or exposure time.

However, with a few exception what is most important in case of camera is the portability and therefore effort is made to realize a smaller and lighter camera, whereby it is remarkably difficult to bring such a number of the electrical circuit as mentioned above in the camera body so that effort is made to simplify and minimize the circuit composition. For example the integration of the circuits is one of the efforts, whereby it is possible to realize the minimization of the circuits by composing the most part of the exposure control circuits including integrated circuit, while the wirings between the integrated circuits and the circuit elements still remain, so that the manufacturing process can not be reduced so largely. Especially it is necessary to provide the light measurement circuit, the operation control circuit and the indication circuit at the different positions due to the special composition of the camera so that it is very difficult to realize the automation of the circuit assembling, while the wiring is reduced, by providing the circuit on one printed plate. At the same time, the electrical circuits are generally brought in the space left in the camera body which is principally mechanically composed, whereby each circuit is divided in several parts so as to be brought in the left space while the circuits are connected to each other by the wirings so that even if the circuit composition is made small the wiring can not be reduced in such a manner that the troublesome manufacturing as well as the decrease of durability and reliability is inavoidable.

Especially the circuit is becoming more and more large scaled in case of the camera of totally digital control system, so that it is all the more desired that the effective integration of the circuit with little wiring should be realized.

SUMMARY OF THE INVENTION

The purpose of the present invention is to offer a novel integrated circuit composition by means of which the design of camera can be facilitated, eliminating the difficult consideration on the arrangement of the electrical circuits in the camera body, while enabling the minimization of the circuits as well as the reduction of the wiring by making use of a novel composition for integrated circuit, more particularly an integrated circuit body by means of which the circuits can largely be minimized while the wiring can also be reduced, by arranging the light measurement circuit including a light sensing element, the indication circuit including an indication mean, the operation control circuit and so on, on one integrated circuit plate.

Description of Preferred Embodiments

Figure 1:
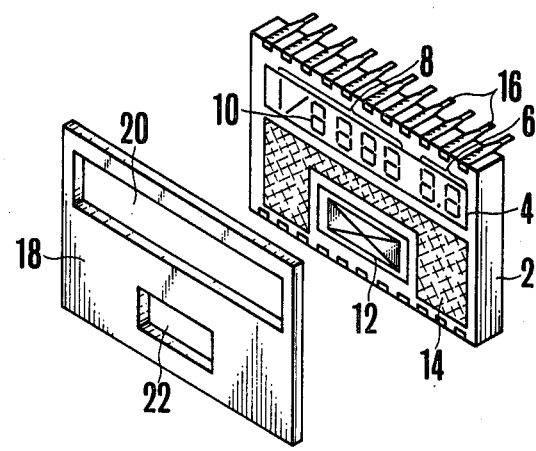
FIG. 1 shows an embodiment of the integrated circuit body of the present invention in a dismantled perspective view.
Figure 2:
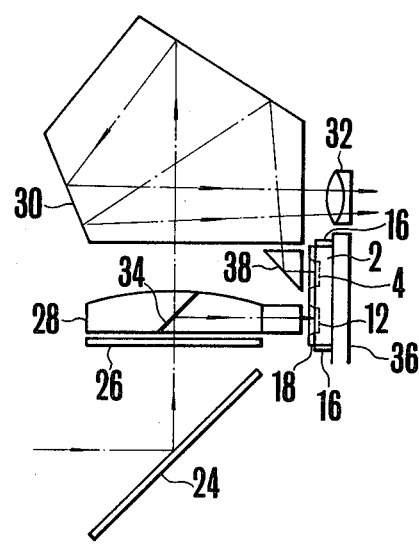
FIG. 2 shows a partial lengthwise section of the integrated circuit body composed as shown in FIG. 1, being applied for a single reflex camera with TTL light measuring system.

FIG. 1 shows an embodiment of the integrated circuit of the present invention in a dismantled perspective view, while FIG. 2 shows a partial lengthwise section of the integrated circuit body composed as is shown in FIG. 1, being applied for a single reflex camera with TTL light measuring system.

In FIGS. 1, 2 is the integrated circuit plate, 4 the indication part which consists of the aperture indication part 6 and of the exposure time indication part 8, for example, by composing the illuminating elements 10 in shape of 8, so as to indicate the necessary informations in digital values, 12 the light sensing part such as of cd cell or silicon photocell for responsing the light so as to produce an electrical signal corresponding to the intensity of the light and 14 the main circuit part including the processing circuit (for example, a digital-analogue converting circuit) of the output signal of the above mentioned light sensing part 12, the operation circuit, the control circuit and so on. 16 is the terminal part for supplying current to the circuits on the integrated circuit plate 2 or the obtaining the electrical connections with the external circuits, and 18 the light shading cover being cemented on the above mentioned integrated circuit plate and presenting a window 20 corresponding to the indication part 4 and a window 22 corresponding to the light sensing part.

The integrated circuit body composed as mentioned above is contained in the camera body as is shown in FIG. 2, whereby 24 is the reflecting mirror for leading the light beam coming through the optical system not shown in the drawing to the focus plate 26 so as to form an image on the focus plate, 28 the condenser lens for leading the diverging light beam having formed an image on the focus plate 26 to the pentagonal prism 30, 32 the eye piece lens for observing the image formed on the focus plate 26 through the above mentioned pentagonal prism 28, 34 the light beam splitter for leading a part of the diverging light beam having formed an image on the focus plate 26 to the light sensing part 12 on the integrated circuit plate 2 whose terminal group is connected with the socket 36 and fixed and 38 the prism for leading the information indicated by the indication part 4 on the above mentioned integrated circuit plate 2 to the above mentioned pentagonal prism 30.

Figure 3:
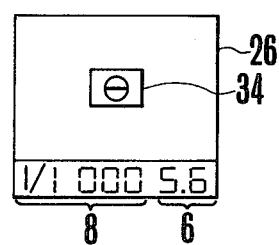
FIG. 3 shows an embodiment of the view finder of the camera.

In the above mentioned composition, the light beam coming from the object to be photographed through the lens not shown in the drawing is reflected by means of the reflecting mirror 24 and diverged after having formed an image on the focus plate 26. A part of this diverged light beam is led to the light sensing part 12 on the above mentioned integrated circuit plate 2 by means of the light beam splitter 34. In this way, the light beam led to the light sensing part 12 is converted into an electrical signal corresponding to its intensity and further converted into a signal in a form necessary for the operation for the exposure control by means of the signal processing circuit in the principal circuit 14 on the above mentioned integrated circuit plate 2. The information obtained in this way, of the brightness of the object to be photographed is processed in the operation circuit in the principal circuit 14 together with various information for the exposure control such as the set aperture value or the set exposure time, the film speed, the totally opened aperture value of the lens to be used and so on given from outside through the terminal group 16 of the above mentioned integrated circuit plate 2 in such a manner that the exposure time or the aperture time necessary for taking a picture with the proper exposure is determined. The exposure time or the aperture value makes the indication elements 10 illuminate selectively by means of the driving circuit of the indication part 4 in such a manner that in the aperture value indicating part 6 the aperture value obtained by operation and in the exposure time indicating part 8 the exposure time obtained by operation is indicated with the digital value. In this way, the aperture value and the exposure time indicated by the indicating part 4 on the integrated circuit plate 2 is led to the pentagonal prism 30 through the prism 38 and further to the eye piece lens 32 through the optical reflection operation. At this time, the aperture time and the exposure time indicated as view finder information can be observed from the eye piece lens 32 in the state as shown in FIG. 3. In FIG. 3, the exposure time is taken as 1/1000 sec. while the aperture value F 5.6.

The aperture value and the exposure time operated and indicated in this way are converted into the control signal for actually controlling the exposure of the camera by the control circuit in the principal circuit 14 on the integrated circuit plate 2 and delivered through the terminal group 16.

By means of integrating the light sensing part for measuring the light, the indicating part for indication and the circuit part necessary for other exposure control into one circuit as explained above, it is possible not only to reduce largely the wiring for connecting various circuit part but also to largely simplify the manufacturing process. Further the number of the parts can be reduced so that the series productivity is excellent and the manufacturing cost can also largely reduced.

Hereby various compositions and their combinations can be thought of the circuits to be actually arranged on the integrated circuit plate and their functions, whereby several embodiments are as follows.

(1) Embodiment 1

A composition that the indication part for indicating the exposure control informations such as the aperture value, the exposure time and so on and the light sensing part for measuring the light beam coming from the object to be photographed are integrated and arranged on one integrated circuit plate.

(2) Embodiment 2

A composition that the indication part, its driving circuit part (including the driver for indication decoder and so on), the light sensing part and its output signal processing circuit part (including the analogue-digital converter, the logarithmically compressing circuit, the memory circuit for storing the electrical signal corresponding to the light beam coming from the object to be photographed immediately before the rising up of the mirror for taking a photograph in case of the TTL light measuring system for the single reflex camera and so on) are integrated and arranged on one integrated circuit plate.

(3) Embodiment 3

A composition that the indication part for indicating the exposure control informations such as the aperture value, the exposure time and so on, its driving circuit part, the light sensing part for measuring the light beam coming from the object to be photographed and its output signal processing circuit part, the operation circuit part for operating the exposure control informations such as the set aperture value or the set exposure time, the film speed, the information for compensating the measured light amount corresponding to the totally opened aperture value of the lens to be used or for compensating the non linearity between the aperture displacement and the measured light amount in the neighborhood of the totally opened aperture value in case of the TTL light measuring system so as to obtain the information of the aperture value or the exposure time, the operation control circuit part for controlling the above mentioned operation circuit part and the control circuit part for producing the control signal for actually controlling the exposure of the camera in accordance with the exposure control informations obtained from the operation are integrated and arranged on one integrated circuit plate. Hereby the above mentioned operation circuit can be either the operation circuit with priority on aperture value for obtaining the information output for automatically controlling the exposure time while the aperture value is set in advance, or the operation circuit with priority on shutter time for obtaining the information output for automatically controlling the aperture value while the exposure time is set in advance, or the operation circuit consisting of both of the above mentioned operation circuit by means of which the priority on aperture value or the priority on shutter time can optionally be selected. Further the operation control circuit part includes the circuit for changing over of the above mentioned operation circuit in functional engagement of the priority selection in case of the circuit by means of which either the priority on aperture value or the priority on shutter time can optionally be selected.

(4) Embodiment 4

A composition that the signal processing circuit for converting a signal corresponding to the brightness of the object to be photographed, coming from the light sensing element provided outside of an integrated circuit plate for measuring the light beam coming from the object to be photographed into a form necessary for controlling the exposure, the operation circuit part for operating the exposure control informations such as the set aperture value, the set exposure time, the film speed, the totally opened aperture value of the lens to be used and so on given from outside and the information of the brightness of the object to be photographed given from the light sensing part through the output signal processing circuit part so as to obtain the informations of the aperture value, the exposure time necessary for controlling the exposure, the operation control circuit part for controlling the above mentioned operation circuit part, the control circuit part for producing a control signal for actually controlling the exposure of the camera in accordance with the exposure control information obtained from the operation, the indication part for indicating the exposure control informations such as the aperture value, the exposure time and so on and its driving circuit part are integrated and arranged in one integrated circuit part.

(5) Embodiment 5

A composition that the light sensing part for measuring the light beam coming from the object to be measured, its output signal processing circuit part, the operation circuit part for operating the exposure control informations such as the set aperture value, the set exposure time, the film speed, the totally opened aperture value of the lens to be used and so on given from outside and the information of the brightness of the object to be photographed given from the light sensing part through the output signal processing circuit part so as to obtain the information of the aperture value, the exposure time necessary for controlling the exposure, the operation control circuit part for controlling the above mentioned operation circuit part and the control circuit for producing the control signal for actually controlling the exposure of the camera in accordance with the exposure control information obtained by the operation are integrated and arranged on one integrated circuit plate.

In case of the above mentioned embodiments, the light measuring part and the indicating part necessary for controlling exposure are integrated and arranged on one plate together with other operation circuit, the control circuit and so on, whereby by means of selecting their combination so as to be able to obtain the best yield rate in the production of the integrated circuit it is possible to obtain the integrated circuit body at low production cost.

Figure 4:
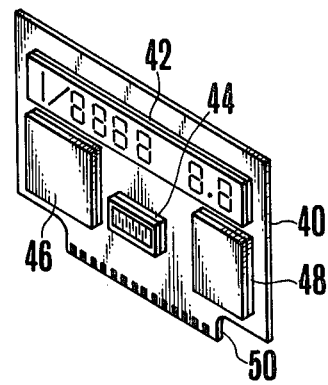
FIGS. 4, 5 and 6 show further other embodiment of the integrated circuit body of the present invention in perspective view.

Further such an integrated circuit body as can easily be altered in the design and the specification, being let to present freedom in the circuit composition to be arranged on the plate is realizable by applying the composition as is shown in FIG. 4.

Namely, all the circuit functions are integrated and arranged on one plate 40, whereby the indication unit 42 in which the indication function and its driving circuit are integrated, the light sensing unit 44 in which the light sensing function and the processing circuit for the signal of the light sensed are integrated, the operating unit 46 in which the operating function, its control circuit and so on are integrated and the control unit 48 in which the control function, the clock signal producing circuit and so on are integrated are arranged on one plate 40 on which the wirings are printed so as to electrically connect the above mentioned unit to each other. Hereby 50 is the connector part for connecting the circuits on the above mentioned plate 40 to the external circuits. Hereby the composition shown in FIG. 4 can be molded in one body, while the indication function of the indication unit 42, the light sensing function of the light sensing unit 44 and the connector part 50 are left exposed in order to prevent the deterioration of the circuits or their connecting parts due to the external factors such as vibration and improve the durability.

Figure 5:
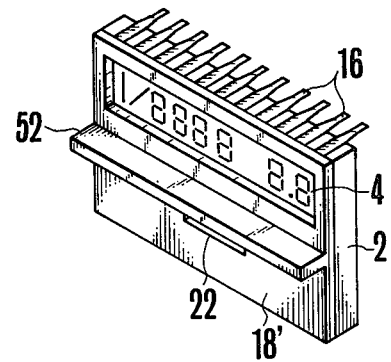
Figure 6:
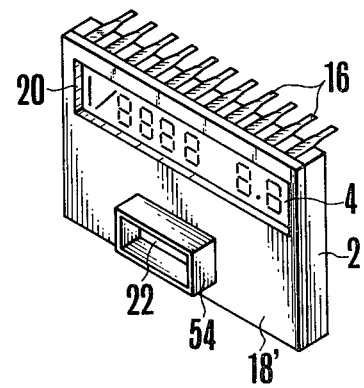

Further in case of the composition that the indication function part and the light sensing function part are arranged on one plate, there is a danger that the light could escape from the indication function part into the light sensing function part so as to give an undesired influence on the light measurement of the object to be photographed. In consequence the arrangement of a cover 18' is recommended, whereby as is shown in FIG. 5 a light shading plate 52 is provided between the indication function part 4 and the light sensing function plate 12 so as to minimize the influence of the light escaping from the indication function part 4 to the light sensing function part 12. Further in stead of the above mentioned light shading plate 52 a hood 54 as is shown in FIG. 6 can be provided in front of the light sensing function part 12. In case of the composition as is shown in FIG. 6, the hood 54 minimize not only the influence of the light coming from the indication function part 4 but also the influence of the light reflected by the internal surface or coming from the view finder, whereby it is possible to carry out the light measurement of the object to be photographed at the light sensing function part 12 with little noise element. It goes without saying that the cover 18' can be applied not only for the embodiment shown in FIG. 1, but also for the embodiment shown in FIG. 4.

For all the electrical circuits, the light sensing part and the indication means used in the above mentioned embodiments conventional ones are applicable.

As to the integrated circuit body in accordance with the present invention the case that it is applied for the exposure control circuit of the camera is explained in accordance with the above mentioned embodiment, whereby the present invention is not limited to the camera but can be applied for the exposure meter, the illuminometer and other electronic devices and therefore the profitability is very large.

What is claimed is:

1. An indication and photometric unit provided with a base plate having an insulating surface, comprising:
   photometric means, said means being adapted to produce an electric signal corresponding to the reflected light coming from an object;
   output signal processing means, said means being adapted to receive an electric signal emitted from said photosensitive means and to produce object brightness information;
   means for driving photographic information, said means being adapted to receive a photographic information signal emitted from a photographic information operation means and to produce a driving signal to indicate a photographic information;
   means for indicating photographic information, said means being adapted to receive a driving signal emitted from said photographic information driving means to indicate the photographic information;

photographic information operation means, said means being connected with both of the output signal processing means at the output terminal thereof and the base plate of said integrated circuit at the input terminal thereof to receive the photographic information as well as to output an exposure information for controlling the exposure;

said photosensitive means and said processing means as well as said indicating means and said driving means being mounted on the base plate in the same plane;

a means for producing an exposure control signal, said means including an integrated circuit exposure control secured on the base plate in the same plane as that of the photosensitive means and connected to the exposure information operation means so as to produce an exposure control signal;

a cover means secured on the base plate for covering and light shielding the output signal processing means, the exposure information processing means, the photographic information driving means and the exposure control driving means secured on the base plate and forming a light receiving opening for the photosensitive means and an opening for exposing the photographic information display means.

2. An indication and photometric unit for a camera according to claim 30, further comprising a light shield plate, said plate being arranged between the photosensitive means and the photographic information display means on the cover means so as to prevent light from the photographic information display means from reaching the photosensitive means.

3. An indication and photometric unit for a camera according to claim 1 further comprising a hood means, said means covering the light receiving part of the photosensitive means to exclude unnecessary incident light.

4. For a camera with an optical path for light measurement and/or display and including a base plate having electrical signal input-output terminals, a measuring and indicating unit comprising:

photosensitive means secured on the base plate for producing an electrical signal corresponding to the light reflected on the object to be photographed and passed through a part of the optical path;

output signal processing means having an integrated circuit secured on the base plate in the same plane as that of the photosensitive means and electrically connected to the photosensitive means for receiving the output signal of the photosensitive means and for producing a signal representing object brightness information;

exposure information processing means having an integrated circuit secured on the base plate in the same plane as that of the photosensitive means and electrically connected to the input terminal on the base plate and the output of the output signal processing means for producing a control signal for controlling an exposure;

driving means having an integrated circuit secured on the base plate in the same plane as that of the photosensitive means and electrically connected to the exposure information processing means for producing a photographic information display signal;

photographic information display indication means secured on the base plate in the same plane as that of the photosensitive means so as to receive the display signal coming from the photographic information driving means and to deliver the photographic information to the optical path; and cover means secured to the base plate and having a light receiving opening for the photosensitive means and the opening for displaying the photographic information.

5. A unit as in claim 4, wherein said cover means secured on the base plate cover said output signal processing means and said exposure information processing means as well as said photographic information driving means while exposing said photosensitive means and said display means for shielding said output signal processing means and said exposure information processing means as well as the photographic information driving means from light from an object as well as from the display means.

* * * * *